US005857856A

United States Patent [19]

Azuma

[11] Patent Number: 5,857,856

[45] Date of Patent: Jan. 12, 1999

[54] APPARATUS AND SYSTEM FOR GENERATING SOUND BASED UPON WAVEFORM DATA AND SYSTEM-SEQUENCE DATA

[75] Inventor: Tetsuhiko Azuma, Tokyo, Japan

[73] Assignee: Kabushiki Kaisha Sega Enterprises, Tokyo, Japan

[21] Appl. No.: 439,979

[22] Filed: May 12, 1995

[30] Foreign Application Priority Data

May 13, 1994 [JP] Japan .................................... 6-124375

[51] Int. Cl.[6] ................................ G09B 5/08; G10H 1/36

[52] U.S. Cl. ................................ 434/307 A; 434/307 R; 84/609; 84/477 R; 381/61

[58] Field of Search ................................ 434/307 R–309, 434/318, 365; 84/423 R, 454, 477 R, 601, 609–611, 615, 625, 645; 369/32, 48, 50; 360/19.1, 33.1, 77.01; 348/8, 478, 484, 571, 595, 738; 358/310, 311, 341, 342, 335; 381/61

[56] References Cited

U.S. PATENT DOCUMENTS

| | | | |
|---|---|---|---|
| 4,896,209 | 1/1990 | Matsuzaki et al. | 348/8 |
| 5,153,917 | 10/1992 | Kato | 434/307 A X |
| 5,247,126 | 9/1993 | Okamura et al. | 434/307 A |
| 5,250,745 | 10/1993 | Tsumura | 434/307 A |
| 5,250,747 | 10/1993 | Tsumura | 434/307 A |
| 5,319,452 | 6/1994 | Funahashi | 84/610 X |
| 5,335,073 | 8/1994 | Yamamoto | 434/307 A |
| 5,364,270 | 11/1994 | Aoyama et al. | 434/318 X |
| 5,397,853 | 3/1995 | Koguchi | 434/307 A |
| 5,473,106 | 12/1995 | Miyashita et al. | 84/609 |
| 5,489,103 | 2/1996 | Okamoto | 434/307 A |
| 5,542,000 | 7/1996 | Semba | 434/307 A |

*Primary Examiner*—Joe H. Cheng
*Attorney, Agent, or Firm*—Finnegan, Henderson, Farabow, Garrett & Dunner, L.L.P.

[57] ABSTRACT

A sound producing apparatus which implements a sound output process based on waveform data, corresponding to sound generated by the apparatus, and system-sequence data including information for processing the waveform data. The apparatus comprises a read-write main memory for storing the waveform data and system-sequence data of a selected music title. Also included is a first submemory for storing the waveform data, and a second submemory for storing the system-sequence data. A sound signal generator generates sound signals based on the waveform data and the system-sequence data stored in submemories. A controller controls the entry of waveform data and system-sequence data of a selected music title, stored in the main memory, into the first and the second submemories, respectively. The controller also controls the sound signal generator based on the system-sequence data stored in the second submemory. A communication controller controls the entry of waveform data and system-sequence data, received from a host unit over a telecommunication line, into the main memory.

19 Claims, 5 Drawing Sheets

APPARATUS AND SYSTEM FOR GENERATING SOUND BASED UPON WAVEFORM DATA AND SYSTEM-SEQUENCE DATA

BACKGROUND OF THE INVENTION

A. Field of the Invention

This invention relates to a sound producing apparatus, and a system employing such an apparatus, for implementing the process of production and output of the necessary sounds used in, for example, television game machines or karaoke units. In particular, the invention relates to a sound producing apparatus, and a system employing such an apparatus, which generate sound signals based on sound-production data.

B. Description of the Prior Art

A conventional system for producing and processing sounds is known as the "karaoke system." A conventional karaoke system mainly employs laser discs. This karaoke system obtains the necessary signals through optical pick-up from the laser disc in which the sound signals and picture signals are stored, demodulates them through signal demodulator circuits, displays the pictures based on the picture signals on a display, and reproduces the sound based on the sound signals from speakers.

If one tried to stock 10,000 musical titles, for example, in one karaoke system of the type above, the karaoke system itself would be oversized. In addition, it would have the weakness of requiring extra work necessary for adding and changing the laser discs. Another weakness is that the laser discs themselves could not be supplemented immediately after the release of new musical titles.

Recently, a karaoke system has been provided which has resolved such weak points. This karaoke system comprises a host unit which stores a predetermined number of music titles and transfers them to a terminal karaoke unit which accesses the host unit. Then, the karaoke unit can reproduce the sounds and pictures based on the data transferred from the host unit and realizes musical performance.

Such a karaoke system has been constructed in consideration of the following points. First, the data necessary for the karaoke system is classified in waveform data relating to the sound to be generated and musical performance data for controlling the timing of synthesizing the sound. Second, the karaoke system is constructed in a manner such that the necessary amount of sound waveform data for the titles currently being provided can be written in the ROM as a sound source IC. This ROM data can be used by the sound signal generator and sound processor arranged in the karaoke unit. Third, the sound given forth can be produced from the musical performance data and the waveform data stored in the ROM. Fourth, each of the terminal karaoke units is constructed so as to be able to communicate with the host unit which stores the musical performance data of a great number of musical titles.

When a musical title is selected by a user or player at the terminal karaoke unit, this information is transferred to the host unit. The host unit transfers the musical performance data, which is the sound production data for the relevant title to the karaoke unit. The karaoke unit produces the sound signals through its sound signal generating and processing unit based on such musical performance data and the waveform data of the ROM. Then, the necessary sound output relating to selected musical title is obtained.

This type of karaoke system does not require supply of the terminal karaoke unit with supplementary performance data of each new title. It does, though, enable the karaoke unit to perform new titles immediately merely by supplying the host unit with the supplementary performance data relating to the new titles.

However, the karaoke system described above has the weakness that the variation of timbres becomes fixed as the waveform data is stored in ROM. Depending upon the contents of the performance data, lack of adequate waveform data for production of the sounds may arise. In addition, production of sounds may deteriorate or even become impossible.

Naturally, the exchange of ROM leads to addition or renewal of waveform data and accordingly to an increase or change in timbres. The additional installment of ROM leads to the addition of new waveform data and accordingly to an increase in the number of timbres. However, this solution requires not only extra work, but it is also very difficult to perform this at all of the terminal karaoke units.

SUMMARY OF THE INVENTION

The objective of this invention is to solve such weak points and, without fixing the timbre, provide a sound producing apparatus and system employing such apparatus which can be used by adding new timbres at any desired time.

The sound producing apparatus of the present invention implements the sound signal production and processing in order to generate sound signals based on sound source data and system-sequence data of the sound. The sound source data includes waveform data, which is stored in a read-write memory.

Accordingly, the memory can be supplied with supplemental waveform data from outside the sound producing apparatus. Therefore, the waveform data of timbres will not be fixed, and new waveform data to produce new timbres can be added to the memory. Thus, there is no need to exchange, install or load ROMs with the waveform data, and one can enjoy new timbres very easily. By adding waveform data, performance of music based upon the same system-sequence data but with different timbres is made possible, allowing for a variety of performances.

In the sound synthesizing apparatus of the present invention, external waveform data can be securely stored in its memory through telecommunication lines. This main memory is able to store a relatively large amount of data, and has a main memory which can store the external waveform data. Also included is a first submemory for storing the waveform data and a second submemory for storing the system-sequence data. The sound signal generator produces the sound signal based on the data stored in these memories so that the arithmetic processing speed becomes faster.

When a predetermined music title is to be reproduced, the sound producing apparatus loads the first submemory with the waveform data for the relevant music title from the main memory, and loads the second submemory with the system-sequence data from the main memory. The device, according to the present invention, implements the appropriate processing of the waveform data based on the system-sequence data of the second submemory. The device then produces predetermined scales, for example, and is thereby able to rapidly control the motions of the sound signal generator and develop the sound signals reliably.

The sound producing apparatus of the present invention is able to rapidly detect whether or not the waveform data and the system-sequence data, relating to the musical title which is selected by user, exists inside the main memory. If the waveform data or system-sequence data is not in the main memory, then the sound producing apparatus can install the external data.

The apparatus or system of the present invention comprises a communicator for rapidly transferring the data from an external host unit to the main memory. The main memory comprises a magnetic storage element that can be loaded with a large amount of data. The first submemory for the waveform data and the second submemory for the system-sequence data each comprise a random access memory. Therefore, it is possible to read this data rapidly, enabling the high-speed production of the sound signals.

A first controller performs the transferring of the data from the main memory to the first and second submemories, and the processing thereof. A second controller controls the motions of the sound signal generating and processing unit in separate arithmetic processing units. By splitting these processes, an effective realization of high-speed processing motions and processing variations is achieved since these processes can proceed in parallel. Further, the system of the present invention is capable of supplying each of the sound producing apparatus with the necessary waveform data from a common host unit.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention.

In the drawings.

DESCRIPTION OF THE PREFERRED EMBODIMENTS

A preferred embodiment of the present invention is hereinafter described based on the drawings.

Figure 1:
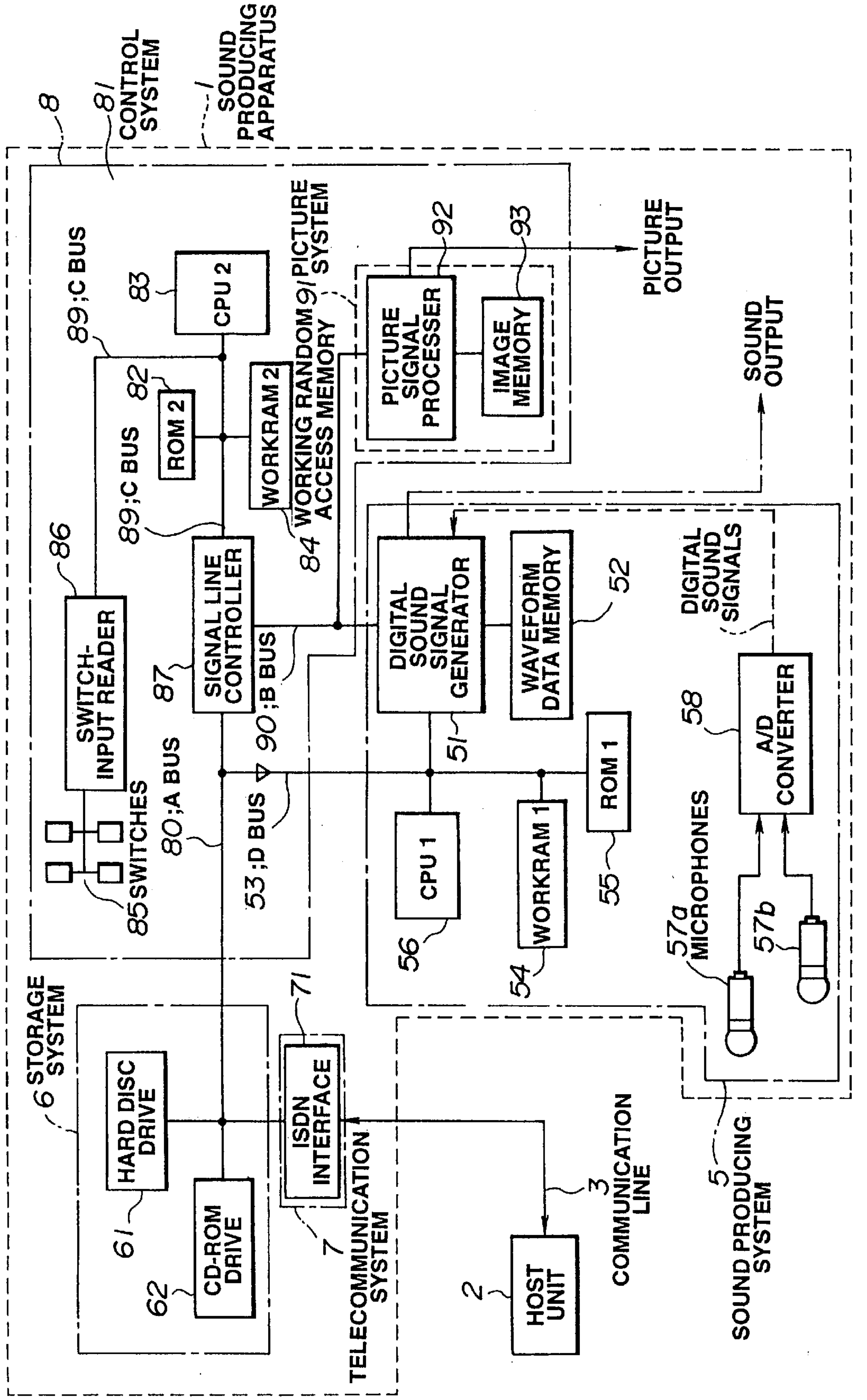
FIG. 1 is a block diagram indicating a preferred embodiment of the sound-reproducing processor of the present invention.

FIG. 1 indicates a block diagram of a sound producing system (this system may be called the system for reproduction of the sound given forth) including embodiments of the sound producing apparatus (this unit may be called the unit which reproduces and processes the sound given forth) according to the present invention.

The system indicated in FIG. 1 comprises, broadly divided, a sound producing apparatus 1, a host unit 2 and telecommunication lines 3. The telecommunication lines 3, which may comprise integrated service digital network (ISDN) lines, connect the sound producing apparatus 1 and the host unit 2 together.

Figure 3:
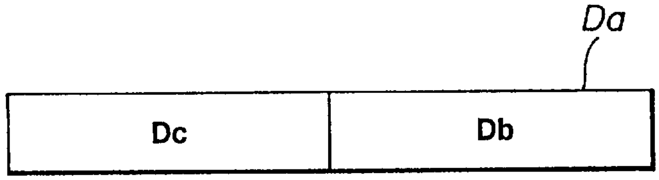
FIG. 3 is a descriptive figure indicating the construction of the sound reproduction data used in the preferred embodiment.

The sound producing apparatus 1 communicates, when necessary, with host unit 2 through telecommunication line 3. The sound producing apparatus 1 is able to obtain at least one of the waveform data and the system-sequence data stored in the host unit. The system-sequence data is, for example, the sound reproduction data of new titles. The sound production data Da is necessary data for obtaining the sound signals for the production of a predetermined title (music title). As indicated in FIG. 3, the data Da comprises the waveform data Db, corresponding to the sound to be generated, and the system-sequence data Dc. The data Dc controls the timing, for example, of such sound to be developed.

The predetermined music title, which is usually determined by a title number, and the corresponding system-sequence data is listed in a record table. By selecting a title number, the corresponding system-sequence data based on this record table is selected. This record table is set and stored in a storage system described below.

Next, the waveform data and the system-sequence data is described in detail. The waveform data Db is sound data for determining the timbre which corresponds to various timbre waveforms of musical instruments. For example, waveforms corresponding to piano and violin timbres may be used. If, for example, there are lacking timbres or if there are no proper timbres for producing the appropriate title, then external waveform data Db can be supplemented, added, or renewed which correspond to such timbres. This will be described in more detail below.

On the other hand, the system-sequence data Dc comprises sequence data. The data Dc is principally equal to the conventional musical performance data, timbre data and system data. In detail, these are data groups necessary for creating the sound signals in order to obtain the actual sound output employing the waveform data Db. Thus, these data groups may be data for implementing the processing and working of the waveform data Db. This may include the decision of which waveform data should be selected for reproducing and developing the sound, the output timing of the necessary waveform data Db, or synthesis of a plurality of waveform data. The system-sequence data also includes data for realizing background music, conversation between persons or any other musical scales employing the waveform data. In other words, this is data for realizing the music notes. Further, the sequence data is data for realizing the scales corresponding to the notes of the music to be performed. The timbre data includes data relating to the waveform to be used for enabling the selection of one or more predetermined waveform data and, for example, controlling parameter data. The controlling parameter data relates to the output timing of the waveform data and the working and processing of the waveform data, and is used to reproduce, change or arrange the timbre. The system data also includes data for controlling the reproduction style, such as the tempo of the sound to be reproduced, the reproduction speed and the volume curve.

The sound producing apparatus 1 comprises, broadly divided, a sound producing or generating system 5 which produces sound signals based on the waveform data Db and the system-sequence data Dc. A storage system 6 (for example, magnetic storage element such as hard discs) is included, and acts as the main memory, for storing a relatively large amount of sound production data Da to produce the sound. A communication system 7 is provided for communicating with the host unit 2, and a system 8 is provided for implementing the other processes. The storage system 6 comprises a storage area for storing the waveform data and another storage area for storing the system-sequence data. These storage systems may be formed as separate memories.

The sound producing system 5 includes a digital sound signal generator 51, and is connected to a read-write memory (RAM) 52 which stores the waveform data. Also included is a read-write first working RAM 54 for storing the system-sequence data Dc (refer to FIG. 3), and is connected to D bus 53. Also connected with D bus 53 is a first ROM 55 which is loaded with the program and data for controlling the sound producing system 5. A first arithmetic processing unit (first CPU) 56 is provided for implementing the reading or writing of parameters in the controlling register inside the sound signal generator 51. A CPU 56 controls the sound producing system 5 in accordance with a program loaded in the ROM 55. This program acts as a process for the output for karaoke background music based on the system-sequence data. Finally, an A/D converter 58 is provided for converting the sound signals from microphones 57*a*, 57*b* in digital sound signals.

The digital sound signal producing unit 51 implements the generating and working of sound signals from the sound production data of FIG. 3 in accordance with the control by the CPU 56. The sound signal generator 51 then produces or outputs the sound of background music, for example, based upon the sound production data. In other words, the digital sound signal generator 51 processes or works the waveform data Db supplied from the waveform data memory 52 based on the system-sequence data Dc to acquire the necessary sound.

The digital sound signal generator 51 is constructed such that it can precisely produce, for example, 1,024 sound levels from dividing the scale of one octave into 1,024 equal parts. In other words, 1,024 degrees of sounds in the scale of one octave is produced from one waveform data based on the system-sequence data. Accordingly, the data of at least one musical scale suffices for one timbre (for example, one musical instrument) as the waveform data to be set and stored in the magnetic storage described below. This can be realized by sampling one scale sound from each octave and storing this as waveform data. Equally, a plurality of waveform data of a scale for one timbre may be stored as well. This digital sound signal generator 51 synthesizes or combines the background music with the input data from microphones 57*a* and 57*b* and outputs the synthesis result as sound.

The storage system 6 comprises a hard disc (magnetic storage element) drive 61, including a controller and a CD-ROM drive 62 which further includes a controller interface. The hard disc drive 61 and the CD-ROM drive 62 are connected to A bus 80. The hard disc drive 61is loaded with the waveform data Db and system-sequence data Dc and maintains this data. The CD-ROM drive 62 downloads or transfers the sound production data Da, including a great amount of the waveform data Db and the system-sequence data Dc which is stored in the CD-ROM, from the CD-ROM to the hard disc. Accordingly, through the CD-ROM, it is possible to add or renew the system-sequence data and/or the waveform data inside the hard disc. In some cases it is even possible to delete the existing system-sequence data and/or waveform data.

As a result, addition or renewal of waveform data may be performed while leaving the system-sequence data as it is. In addition, addition or renewal of system-sequence data and waveform data may be performed, or addition or renewal of system-sequence data may be performed while leaving the waveform data the same. Accordingly, addition or renewal of timbres is made possible and improvements in sound signal quality and a variety of sound production patterns are realized. Further, the addition or renewal of data as above may also be implemented through telecommunication system 7 described below.

Inside the hard disc, a storage area for system-sequence data corresponding to a plurality or music titles is realized. The hard disc also includes a storage area for a plurality of waveform data, and a data record table for selecting the system-sequence data, corresponding to the title name or number. The telecommunication system 7 realizes a means for enclosing data in the hard disc and comprises a ISDN interface 71, including, for example, a controller and an interface. This ISDN interface connects the sound producing apparatus 1 with communication lines 3. The ISDN interface performs the communication for receiving the waveform data Db and/or system-sequence data Dc which does not exist inside the hard disc (i.e., which does not exist inside the CD-ROM). The ISDN interface 71 is connected with A bus 80.

System 8 comprises a control system 81 for the general control of the whole unit 1and a picture system 91 for forming the picture signals. The control system 81 performs the function of controlling the whole unit in accordance with the second ROM 82, and includes the program and data for controlling the whole unit. The system further comprises a second processor (second CPU) 83 which performs control of the whole unit by using the program stored in the ROM 82. Control is also performed by controlling the communication system 7, transferring the system-sequence data Dc of the music to the working memory through D bus 53, and enclosing the waveform data Db or the music in the waveform data memory 52 through unit 51. Also included in the control system 81 is a second working RAM 84 which is used by this CPU 83 for various operations, a switch 85 for the selecting buttons when using the karaoke and including a remote-controlling receiver, a switch-input reader 86 which converts the on/off condition of the switch 85 into digital data, a signal line controller 87 which controls the digital signal flow (direction, etc.), and a C bus 89 which connects units 82 through 87.

Further, the second CPU 83 is connected with the digital sound signal generator 51 and the picture system 91 through C bus 89, signal line controller 87 and B bus 90. CPU 83 is connected with hard disc drive 61, CD-ROM drive 62 and ISDN interface 71. The connection of CPU 83 with these devices is made through C bus 89, signal line controller 87 and A bus 80. The CPU 83 is also connected with D bus 53 through A bus 80.

The picture system 91 comprises a picture signal processor 92, which performs the processing for displaying the image relating to the karaoke and codes such as letters, and a read-write image memory 93. Data or images and codes, for example, which are necessary for the output of pictures by the picture signal processor 92, are loaded into the memory 93. The image memory 93 is connected with picture signal processor 92.

Figure 2:
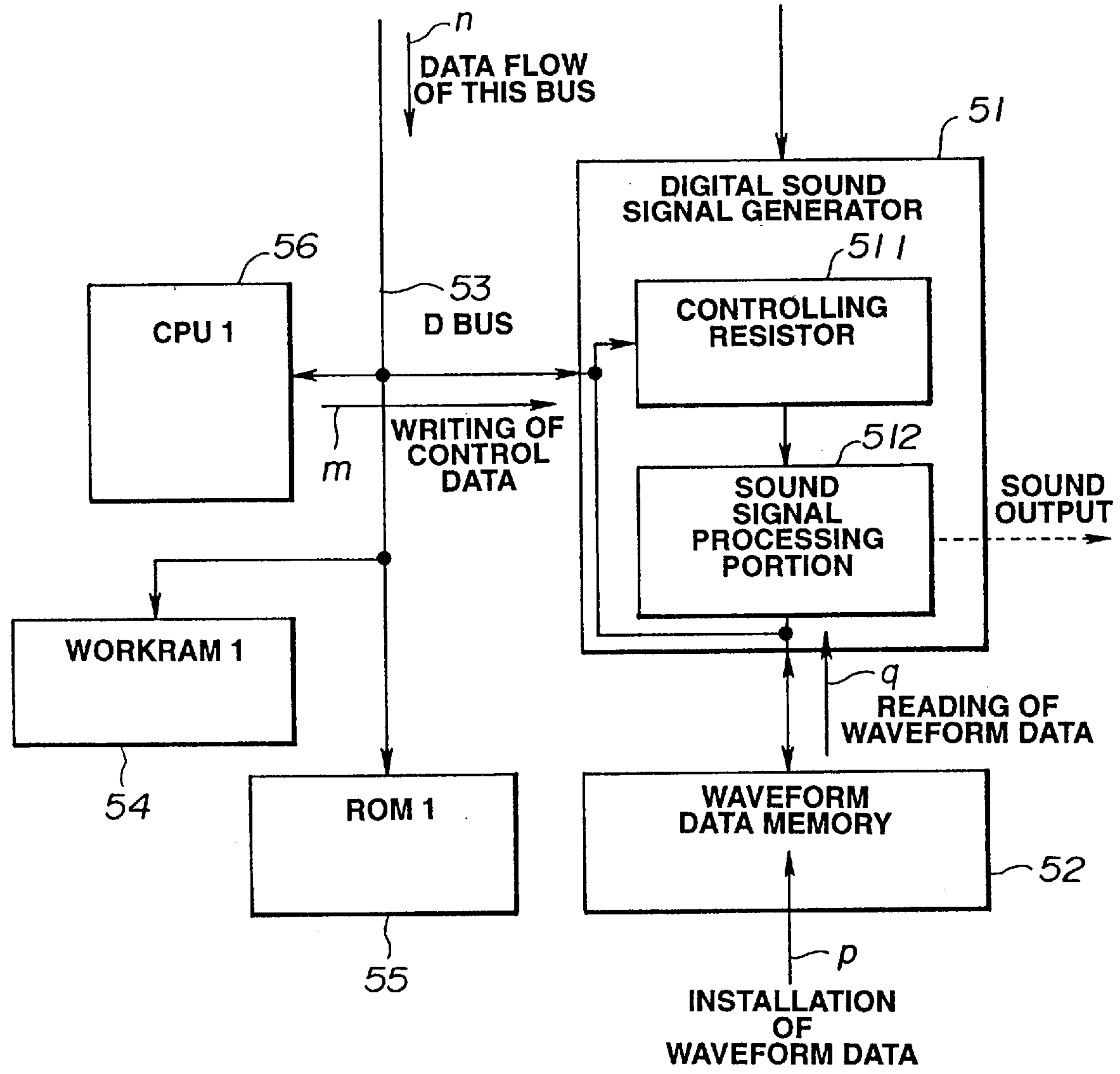
FIG. 2 is a block diagram indicating the essential parts of the preferred embodiment.

FIG. 2 indicates the construction of the digital sound signal generating and processing unit 51. This unit 51 comprises a controlling register 511 and a sound signal processing portion 512. Based on the system-sequence data, the control data corresponding to the controlling parameter stated above is written into the register 511. The sound signal processing portion 512 reads the corresponding waveform data Db from the waveform data memory 52 and converts them, for example, to sound signals (signals of the sound given forth). This processing by the sound signal processing portion 512 is based on the control data stored in the register 511 for obtaining the sound output of the selected music title.

Figure 4:
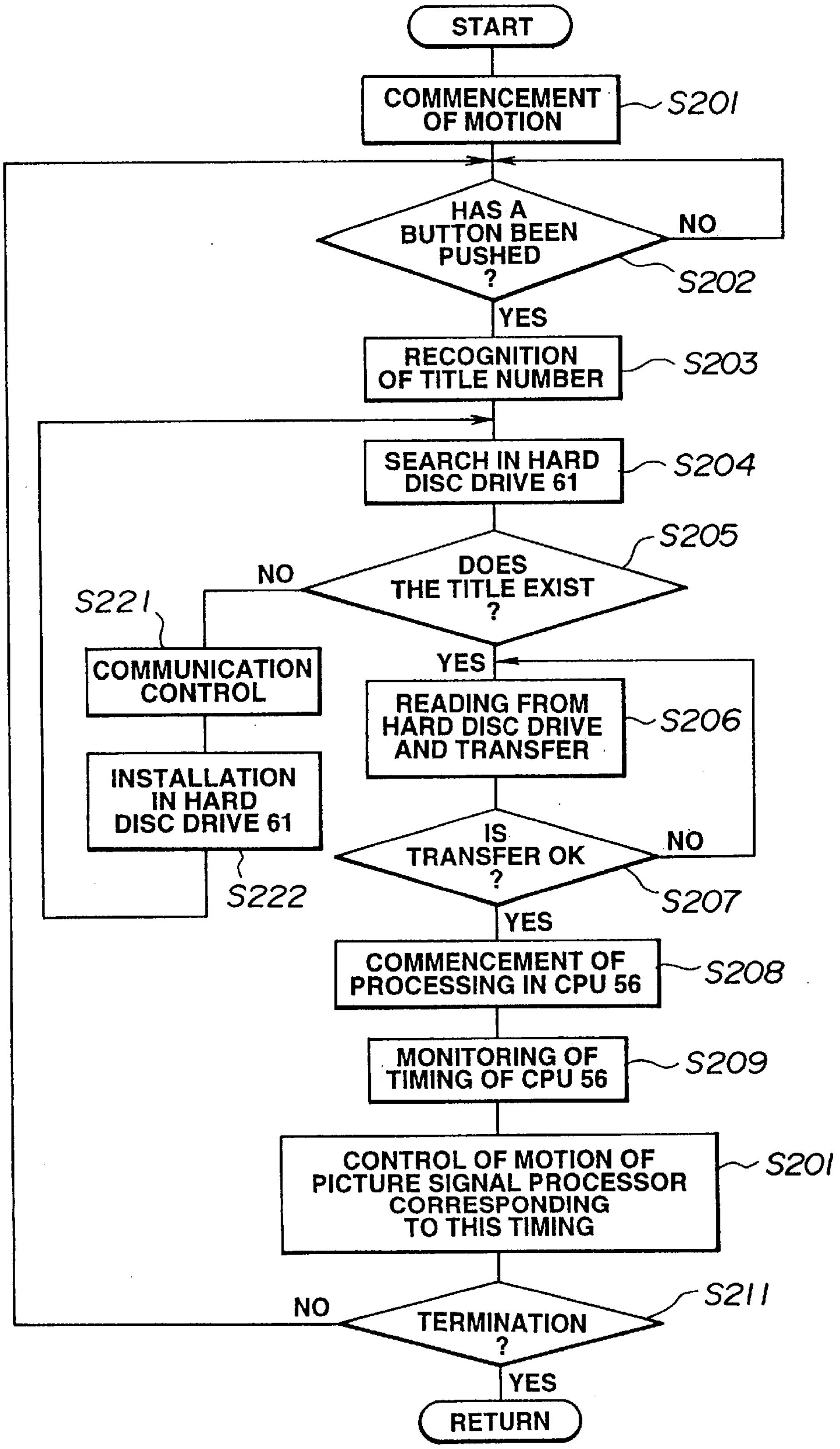
FIG. 4 is a flow chart of the process implemented in the second CPU of the preferred embodiment.
Figure 5:
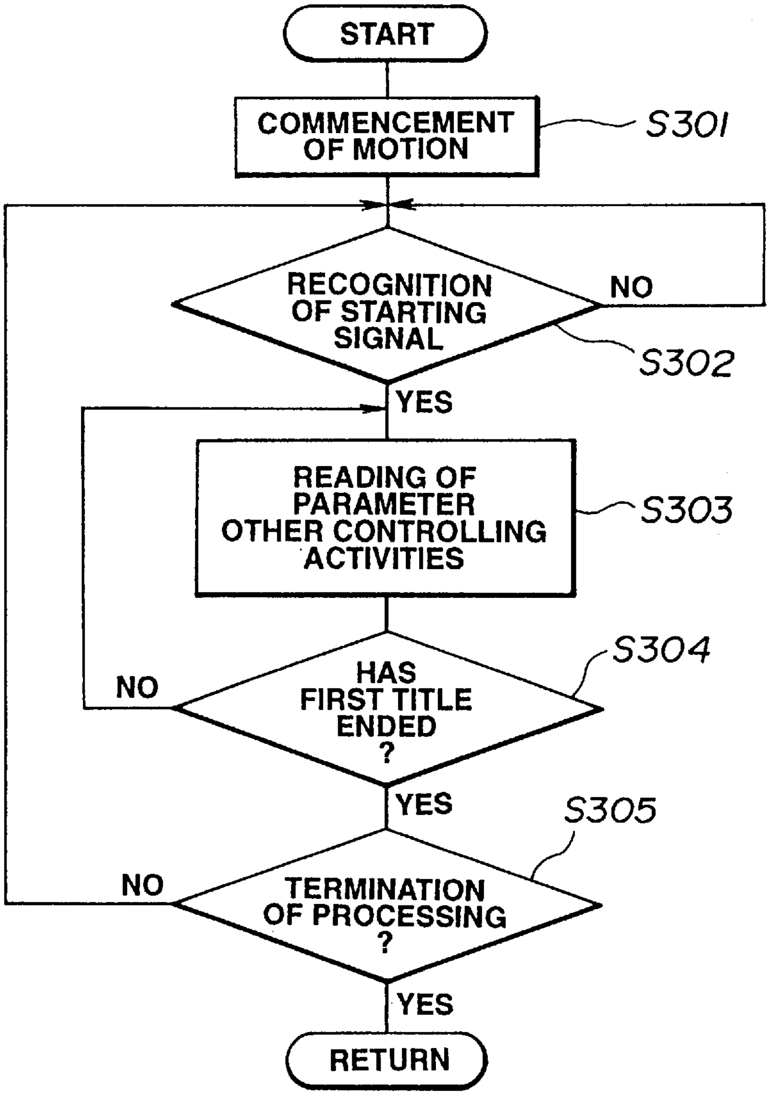
FIG. 5 is a flow chart of the process implemented in the first CPU of the preferred embodiment.

Next, the motions of this sound producing apparatus will be described by employing FIGS. 1 and 2 with reference to FIGS. 4 and 5. FIG. 4 herein is a flow chart describing the motions of the control system of the second CPU 83. FIG. 5 is a flow chart describing the motions of the sound production system of the first CPU 56.

First, CPU 83 of system 8reads the program of the second ROM 82 and commences the motion. At the same time, the first CPU 56 of sound production system 5 reads the program of the first RON 55 and commences with the motion (Step 201 in FIG. 4 and Step 301 in FIG. 5). Under these conditions, the sound producing apparatus 1 is in a movable state. As the switch input and reading unit 86 of system 8are also in a movable state, control by the user is now for the first time possible by using the switch unit (i.e., selecting button) 85. When the user selects a title through the switch unit 85 (Step 202; YES), CPU 83 reads which button has been pushed through the switch input and reading unit and becomes aware of the title number (Step 203).

Next, CPU 83 searches for the hard disc drive 61 in storage system 6 based on such title number (Step 203). When the hard disc drive 61 is searched, a determination in Step 205 is made as to whether or not the title exists. If the relevant title number exists as a title number (the selection data for selecting the system-sequence data), in the record table stored in the hard disc 61, when the system-sequence data corresponding to the selected title exist, the answer in Step 205 is judged YES.

CPU 83 reads the record table of the hard disc, the system-sequence data storage area and the waveform data storage area. The CPU 83 then obtains the sound production data Da (system-sequence data Dc and the waveform data Db which is necessary thereto) and the picture data. The system-sequence data Dc is then written into the first working RAM 54 through D bus 53 (the data flows in the direction of arrow n in FIG. 2 and is written). Furthermore, the waveform data memory 52 is loaded with the waveform data Db through signal controller 87 and B bus 90 (Step 206). The waveform data is transmitted in the direction indicated by arrow p in FIG. 2. At the same time, CPU 83 writes the picture data in image memory 93 through A bus 80, signal controller 87, B bus 90 and picture signal processor 92. Subsequently, when the transfer of this data is OK (Step 207; YES), the next process can be started. However, when the transfer is not OK (Step 207; NO), the process of Step 206 is performed for a second time. If the transfer is OK, CPU 83 hands over the process to CPU 56 and starts the motion of the CPU 56 (Step 208).

Further, CPU 83 monitors the timing at which the CPU 56 writes the controlling parameter based on the system-sequence data Dc of working RAM 54 in the controlling register 511 of the unit 51 (Step 209). The CPU 83 also controls the motions of the picture signal processing unit 92, corresponding to and in synchronization with this timing (Step 210). Thereby, picture signal processor 92 gives the texts, for example, which are generated by the image data of image memory 93, as picture signals to the monitor. Accordingly, the text and other pictures are superimposed on the screen of the monitor at the same time as the sound output. Finally, if the processing is to be continued (Step 211; NO), the process from Step 202 onwards is repeated. If the processing is to be terminated (Step 211; YES), the sound producing apparatus 1 returns to the stand-by state.

On the other hand, when CPU 56 of the sound production system 5 receives the process (i.e., a starting signal) from CPU 83 in Step 208 (Step 302 in FIG. 5; YES), the control data for the processing, working and synthesis of waveform data, which are performed at the musical performance, are subsequently written in control register 511 (refer to FIG. 2) of digital sound signal generator 51 at a predetermined timing (Step 303). The control data may be, for example, the output timing of the waveform data, output pitch, output level, and controlling parameters for modulations. Therefore, the karaoke background music is developed based on the system-sequence data Dc, particularly the timbre data as loaded in working RAM 54.

This control data is transmitted and written as indicated by arrow m in FIG. 2. This writing is performed before musical performance of the title is finished (i.e., during musical performance or a music title) (Step 304; NO). Thereby, in the digital signal generating unit 51, the sound signals for the karaoke background music are generated in the sound signal processing portion 512 based on the waveform data Db from the waveform data memory 52 and the parameter written in the controlling register 511. The sound signals are formed by these background music sound signals and the digital sound signals input through microphones 57*a*, 57*b* and A/D converter 58. Accordingly, the background music sound signals are produced as sounds as sensed or given forth through amplifier circuits or speakers which are not specified in the drawings.

Next, when the musical performance is finished (Step 304; YES) and the process has not ended (Step 305; NO), CPU 56 clears the contents of the data which is stored in RAM 52, 54 and controlling register 511. The process then goes back to Step 302 and waits for the selection of the next music title. When the process is finished (Step 305; YES), CPU 56 returns to Step 301.

Further, when the system-sequence data is not loaded in the hard disc drive 61 (Step 205; NO) due to new titles or special titles, such as titles which are required through selection with a statistically small frequency of old titles, CPU 83 starts ISDN interface 71 of telecommunication system 7.The CPU 83 then demands the transfer of the system-sequence data, related to the title or the system-sequence data, and the waveform data necessary for the system-sequence data, to the host unit 2 through telecommunication lines 3 (Step 221 in FIG. 4).

Now, the data for the title which was transferred to sound-reproducing processor 1 from host unit 2 through telecommunication lines 3 and ISDN interface 71, is loaded in the predetermined storage area in hard disc drive 61 of storage system 6. This is done under the control of CPU 83 (Step 222). The process then goes back to Step 204. The CPU 83 reads successively the waveform data storage area provided in hard disc unit 61. In addition, the CPU 83 judges whether or not during the process in Steps 221 and 222 all waveform data necessary for the production of the transmitted system-sequence data exists at the predetermined storage area inside hard disc unit 61. If there is any lacking waveform data, this data is installed in the predetermined area inside hard disc unit 61 together with the system-sequence data through host unit 2. Therefore, sound producing apparatus 1comprises all data necessary for reproducing new titles or special titles. On the other hand, if all waveform data necessary for the reproduction of the transferred system-sequence data exist inside the hard disc, the signals of the sound as given forth are generated according solely to the waveform data inside the hard disc. The system-sequence data relating to such title, which exists inside host unit 2, is installed in the predetermined area inside hard disc unit 61.

Regarding the newly added system-sequence data, the CPU 83 adds and renews the relation between the relevant title number and the data for selecting the system-sequence data corresponding to this title number in the record table inside the hard disc drive unit 61. CPU 83 sets and stores the transferred system-sequence data or the waveform data in their respective storage areas in the hard disc. In addition, if the same music title is selected thereafter, it is made possible to read the system-sequence data and waveform data relating to this title directly from the hard disc drive unit 61. Further, if the relevant music title does not exist inside the hard disc, the CPU 83 may transfer the system-sequence data relating to this music, title and all waveform data necessary for the reproduction of this system-sequence data from host 2to hard disc 61. This may be done without judging whether or not the waveform data corresponding to such system-sequence data exists or not.

As stated above, the production of the sound is controlled by CPU 56, and the other motions such as control of the system is controlled by CPU 63. Therefore, difficult processing can be implemented and no processes are terminated through the implementation of one motion. To be concrete, during the production of the sound for a predetermined title, the sound signal generator 51 enables the installation of system-sequence data and waveform data of another title in the magnetic storage through telecommunication system 7 and transfer of this data to RAM. Accordingly, installation of external sound production data is also possible during the sound reproduction. Also, music titles can be promptly reproduced even if there is a continued demand for titles which do not exist in the magnetic storage element. Further, a plurality of CPUs provide a variety of motions for generating and processing sounds.

Since the sound producing apparatus 1 comprises a CD-ROM drive 62 of storage system 6 and since data corresponding to a large number of music titles is stored in the CD-ROM, data for music titles inside the hard disc drive 61 can be exchanged simply and promptly. Further, as the data of music titles loaded in host unit 2 is received by using telecommunication lines 3, the supplementation of music data and sound reproduction data Da, to hard disc drive 61, is easily performed.

Figure 6:
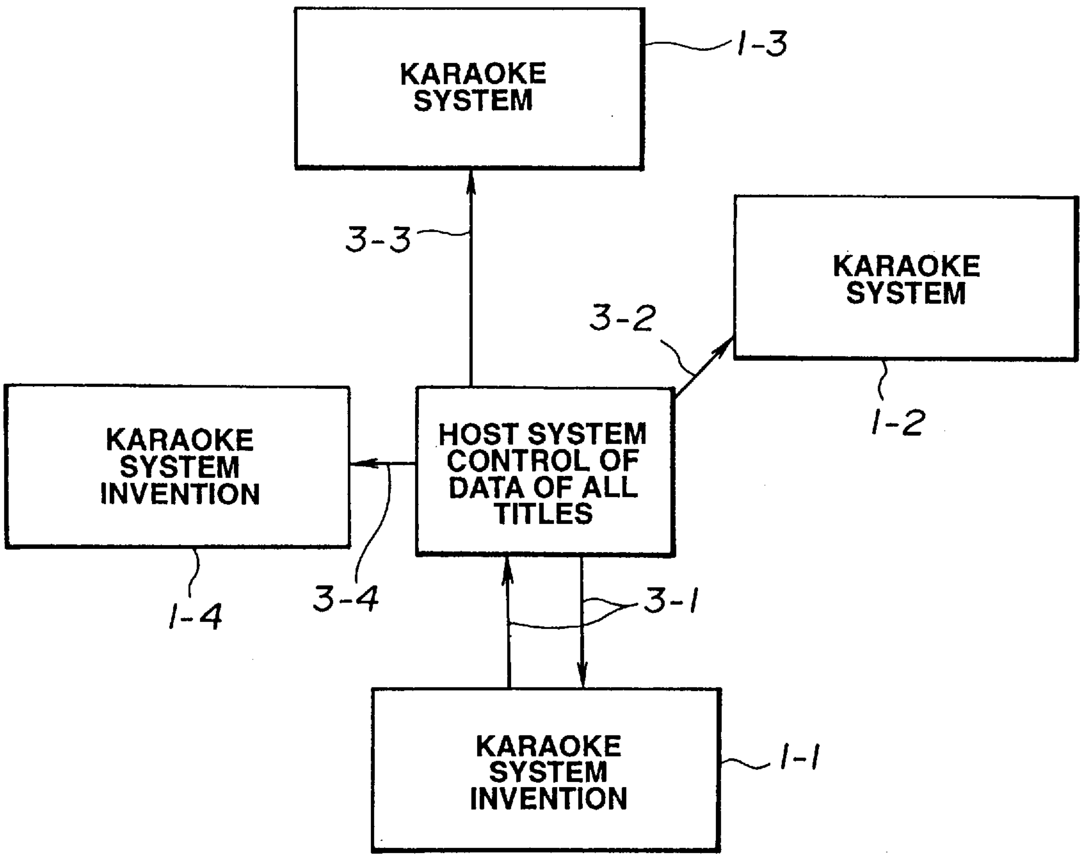
FIG. 6 is a block figure indicating a sound system including the preferred embodiment.

FIG. 6 indicates a block diagram of the sound production system using the sound producing apparatus of the present invention. In FIG. 6, the sound producing apparatus 1-1, 1-2, 1-3 and 1-4 are connected with host unit 2 through telecommunication lines 3-1, 3-2, 3-3 and 3-4, respectively. For example, when sound producing apparatus 1-1 demands the data of a new title (Step 203), and when the demanded music data exists in host unit 2 (Step 205; YES), the waveform data Db and/or system-sequence data Dc of the relevant music title are transferred to apparatus 1-1 (Step 222). Accordingly, each of the sound producing apparatus 1-1, 1-2, 1-3 and 1-4 can immediately receive the data of new titles, for example, as necessary.

According to the present embodiment, the sound production data Da, which comprises the waveform data Db and the system-sequence data Dc, is stored in storage system 6. When a predetermined type of musical performance is implemented, the relevant sound production data Da is read from storage system 6. The waveform data Db is set in waveform data memory 52 through signal controller 87 and B bus 90, and the system-sequence data Dc is set in the first working RAM 54 through D bus 53. Thereafter, the predetermined parameter is obtained from the system-sequence data Dc of working RAM 54 under the control of CPU 56 and read in controlling register 511 of digital sound signal generator 51. The sound signal processing portion 512 of digital sound signal generating and processing unit 51 generates the sound signals based on the waveform data Db in the waveform data memory 52 and the parameter in the controlling register 511. Therefore, according to the present embodiment, there is no need to exchange or additionally install ROMs for waveform data, and it is even possible to supplement new external timbres, enabling the player to enjoy these easily.

Further, as the present embodiment is constructed such that the waveform data and system-sequence data is stored in the hard disc, a relatively large amount of data can be stored. As the waveform data and system-sequence data corresponding to the selected music title is stored in a random access memory for the reproduction of a predetermined music title, this data is used for generating and processing sound signals. As a result, high-speed operation of the sound production signals is performed. Moreover, the sound producing apparatus relating to the present embodiment may also comprise additional functions which enable the selection of background music timbres (i.e., pianos or violin timbres) in addition to the selection of music titles.

Furthermore, the present embodiment is constructed such that the sound production data Da is stored directly in storage system 6 from host unit 2. Notwithstanding this, the sound production data Da from host unit 2 may be stored in working RAM 54 and waveform data memory 52. In this case, there is the possibility that the data stored in working RAM 54 and in the waveform data memory is cleared at termination of the production. To avoid this possibility, this data is preferably stored in the hard disc of storage system 6 for protection. Data erasure is also prevented by directly storing the sound reproduction data Da simultaneously in working RAM 54, waveform data memory 52 and storage system 6.

The timbres stored in the sound producing apparatus relating to the present invention are that of musical instruments, animal voices, voices of persons of different races, ages and sex, etc. Therefore, the sound producer of the present invention may, without limitation to the karaoke unit described above, be applied to sound output units for game machines, for example. As the necessary waveform data is received from an external source, a sufficient variety of waveform data is supplied even if the memory volume of the waveform data memory in the sound producing apparatus itself is held at a minimum. The costs of the device can be lowered thereby, and costs for adding new sound reproduction data can be held at a low level.

The sound producing apparatus relating to the present invention may also receive only the waveform data from the outside, instead of both the waveform data and the system-sequence data. In some cases, the apparatus may also receive only the system-sequence data from the exterior. It is also possible for the sound producing apparatus to transfer external picture data to the magnetic storage. Further, according to the present embodiment, missing waveform data is transmitted from an external host unit by using telecommunication lines. Together with this installation, or instead of this installation, the waveform data may be installed by using, for example, a portable memory, floppy discs or compact discs.

There is no need for the system-sequence data to be stored in a main memory or hard disc drive 61, but apparatus 1may be constructed such that all relevant system-sequence data is enclosed in the main memory through telecommunication system 7 at each time a music title is selected. Apparatus 1 further need not comprise a CD-ROM, but may be constructed such that all data is stored in the main memory from telecommunication system 7. Further, the construction of the connection of a plurality of sound generating processors with common telecommunication lines and a common external host unit may also be adopted.

As the device according to the present invention is constructed such that the waveform data of the main memory is stored in an exclusive memory for storing only the waveform data, and the sound signals are generated based upon the waveform data stored in this waveform data memory, high-speed operation of sound signals and high-speed production is made possible. According to the system of the present invention, each of the sound producing apparatus can be supplied with the necessary waveform data from a common host unit, so that the extra work of separately installing the desired waveform data in each of the sound producing apparatus can be omitted.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

I claim:

1. A sound producing apparatus which implements a sound output process, the apparatus comprising:

a main memory for storing waveform data that determines a timbre for sound produced by the apparatus and for storing system-sequence data including information for processing the waveform data;

a first submemory, coupled to the main memory, for storing the waveform data;

a second submemory, coupled to the main memory, for storing the system-sequence data;

a sound signal generator for generating sound signals based on the waveform data stored in the first submemory and the system-sequence data stored in the second submemory; and a communication controller, coupled to the main memory and the first submemory, for controlling entry of the waveform data, received from a host unit, into at least one of the main memory and the first submemory.

2. The apparatus of claim 1, wherein the sound signal generator generates the sound signals for musical performance by a karaoke system.

3. The apparatus of claim 1, further comprising a picture processor for producing video signals related to the sound signals.

4. The apparatus of claim 1, wherein the first submemory stores the waveform data transferred from the main memory, and wherein the waveform data is received from the host unit over a telecommunication line.

5. The apparatus of claim 4, further comprising:

a system controller for controlling transfers of the waveform data and the system-sequence data from the main memory to the first and the second submemories for a selected music title, and controlling the sound signal generator, based on the system-sequence data stored in the second submemory, to generate the sound signals to reproduce the selected music title.

6. The apparatus of claim 5, wherein the system controller includes a processor for processing the waveform data based on the system-sequence data and controls the sound signal generator to generate the sound signals including a desired timbre.

7. The apparatus of claim 4, further comprising:

means for determining whether waveform data and system-sequence data for producing a selected music title are stored in the main memory; and wherein, when the determining means determines that either or both of the waveform data and the system-sequence data for the selected music title are not stored in the main memory, the communication controller requests and receives from the host unit the waveform data and the system-sequence data not stored in the main memory.

8. The apparatus of claim 4, wherein the main memory is a random access memory.

9. The apparatus of claim 1, wherein the sound signal generator generates sound signals including a plurality of musical scales from the waveform data.

10. The apparatus of claim 1, further comprising:

a music title-selector for user selection of a music title;

means for determining whether waveform data for producing a selected music title is stored in the first submemory; and wherein, when the determining means determines that the waveform data for the selected music title is not stored in the first submemory, the communication controller requests and receives from the host unit the waveform data not stored in the first submemory.

11. The apparatus of claim 1, wherein the system-sequence data comprises a parameter for controlling the sound signal generator to generate the sound signal based on the waveform data, and wherein the sound signal generator comprises a register for storing the parameter.

12. The apparatus of claim 1, further comprising:

a first processor for controlling the sound signal generator based on the system-sequence data; and a second processor for controlling transfer of the waveform data and the system-sequence data from the main memory to the first and the second submemories, respectively.

13. The apparatus of claim 1, wherein the communication controller controls the entry of waveform data of a selected music title, received from the host unit over a telecommunication line, into the first submemory at the same time another selected music title is being reproduced.

14. A sound producing apparatus for generating sound based on waveform data that determines a timbre for sound produced by the apparatus and system-sequence data including information for processing the waveform data, the apparatus comprising:

a read-write main memory storing the waveform data and the system-sequence data of a selected music title;

a first submemory, coupled to the main memory, for storing the waveform data;

a second submemory, coupled to the main memory, for storing the system-sequence data;

a sound signal generator, coupled to the first submemory and the second submemory, for generating sound signals based on the waveform data stored in the first submemory and the system-sequence data stored in the second submemory;

a first controller, coupled to the main memory, the first submemory and the second submemory, for controlling the entry of waveform data of a selected music title stored in the main memory into the first submemory, and for controlling the entry of system-sequence data of a selected music title stored in the main memory into the second submemory, wherein the first controller controls the sound signal generator, based on the system-sequence data stored in the second submemory, to generate the sound signals; and a communication controller, coupled to a host unit and the main memory, for controlling entry of at least one of the waveform data and the system-sequence data, received from the host unit over a telecommunication line, into the main memory.

15. The apparatus of claim 14, wherein the main memory is a random access memory.

16. The apparatus of claim 14, wherein the sound signal generator generates the sound signals for musical performance by a karaoke system.

17. A sound producing system which implements a sound output process, the system comprising:

a plurality of sound producing apparatuses for producing sound, each comprising a read-write main memory storing waveform data that determines a timbre for sound produced by the system;

a host unit that outputs waveform data for entry into each of the read-write main memories, wherein the host unit comprises a host memory storing the waveform data;

a telecommunication line connecting the host unit with each of the sound producing apparatuses; and a communication controller for controlling the data communication between the host unit and each of the sound producing apparatuses over the telecommunication line.

18. A sound producing system which implements a sound output process, the system comprising:

a plurality of sound producing apparatuses for producing sound, each comprising a read-write main memory storing waveform data that determines a timbre for sound produced by the system and storing system-sequence data that includes information for processing the waveform data;

a host unit that outputs waveform data for entry into each of the read-write main memories, wherein the host unit comprises a host memory storing waveform data and system-sequence data of a selected one of a plurality of music titles;

a telecommunication line connecting the host unit with each of the sound producing apparatuses:

a communication controller for controlling the data communication between the host unit and each of the sound producing apparatuses over the telecommunication line; and wherein each of the sound producing apparatuses comprise:

a music title-selector for user selection of a music title;

means for determining whether waveform data and system-sequence data for producing a selected musical title are stored in the read-write main memory; and wherein, when the determining means determines that either or both of the waveform data and the system-sequence data for the selected music title are not stored in the main memory, the communication controller requests and receives from the host unit the waveform data and the system-sequence data not stored in the main memory.

19. A sound producing apparatus which implements a sound output process, the apparatus comprising:

means for requesting and receiving waveform data from a host unit, wherein the waveform data determines a timbre for sound produced by the apparatus; a memory, coupled to the host unit, for storing the requested waveform data; and means for producing sound according to the requested waveform data.

* * * * *